Jan. 28, 1936.　　K. R. MANVILLE　　2,029,178
FOUR-SPEED VEHICLE TRANSMISSION
Filed Sept. 22, 1934
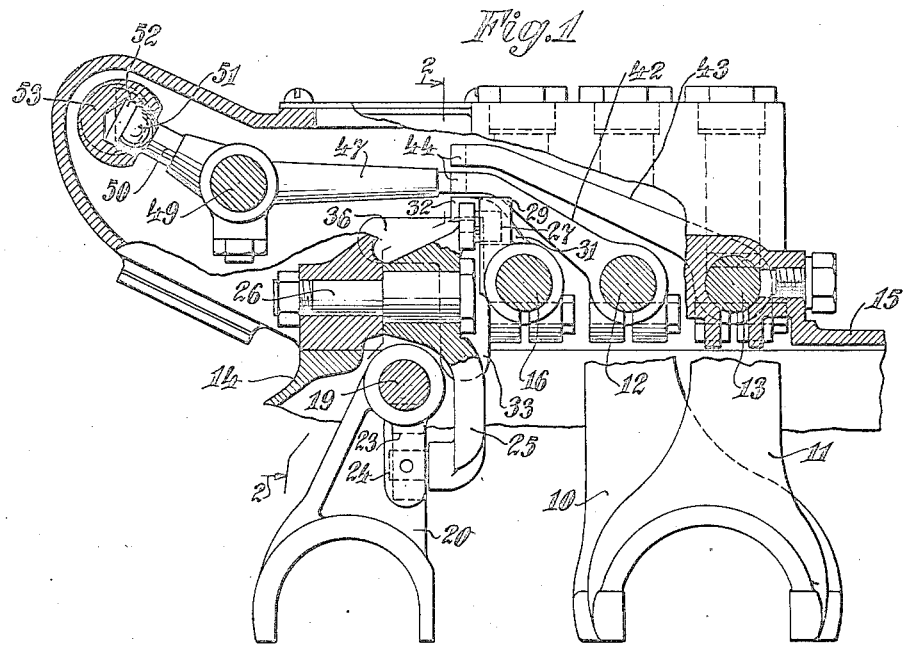
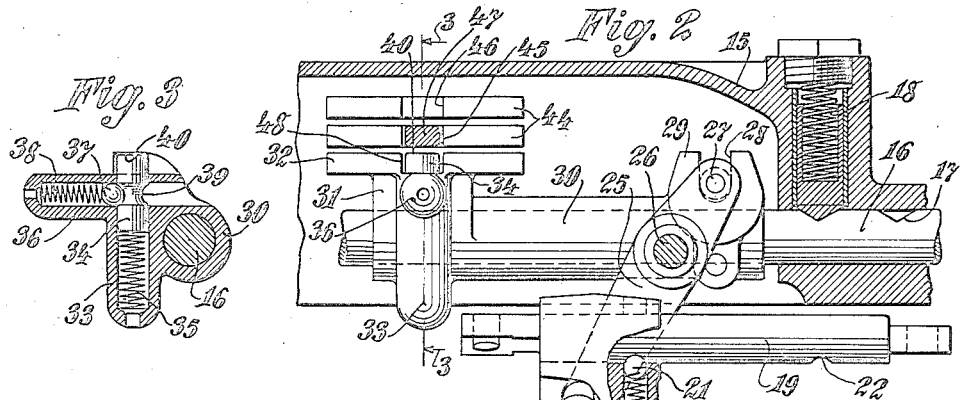
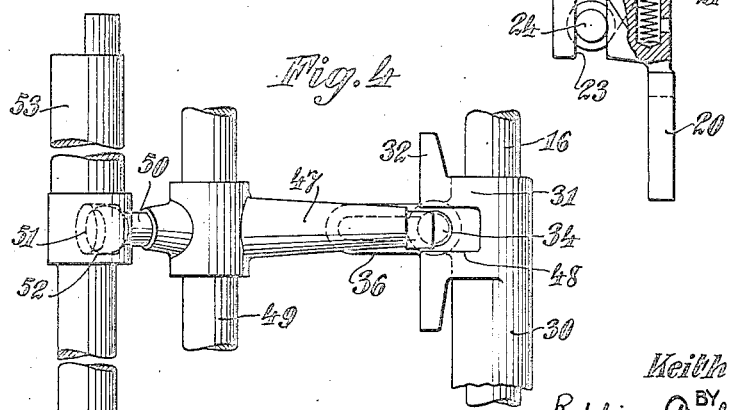
INVENTOR:
Keith R. Manville,
BY Redding, Greeley, O'Shea & Campbell
HIS ATTORNEYS Patented Jan. 28, 1936

2,029,178

UNITED STATES PATENT OFFICE 2,029,178

FOUR-SPEED VEHICLE TRANSMISSION

Keith R. Manville, Highland Park, N. J., assignor to International Motor Company, New York, N. Y., a corporation of Delaware Application September 22, 1934, Serial No. 745,011

1 Claim. (Cl. 74—473)

The present application relates to subject matter somewhat akin to that of applicant's co-pending application Serial No. 745,010, filed September 22, 1934 for Five-speed vehicle transmission.

The present invention relates to transmission mechanisms for motor vehicles and embodies, more specifically, an improved controlling mechanism for multi-speed transmissions wherein the selecting and shifting operations are effected through a mechanism which is offset laterally with respect to the vertical plane of the transmission mechanism, the structure being such that the shifting operations are effected in accordance with standard practice, thus not disturbing the structure of the transmission mechanism proper. More particularly, the invention embodies an improved controlling mechanism for systems of the above character wherein the shifter arm is adapted to engage a member which serves as a stop and guide to position the arm properly for shifting operations to the first and second speed positions. This guide mechanism also serves as a stop to prevent the accidental entering of the arm into the reverse shifter.

Further objects, not specifically enumerated above, will be apparent as the invention is described in greater detail in connection with the accompanying drawing, wherein:

Figure 1 is a view in end elevation, partly broken away and in section showing a controlling mechanism for transmission devices by means of which the selecting and shifting operations may be effected from a laterally offset position with respect to the transmission device.

Figure 2 is a view in section, taken on line 2—2 of Figure 1, and looking in the direction of the arrows.

Figure 3 is a detail view in section, taken on line 3—3 of Figure 2, and looking in the direction of the arrows, this view showing the stop and guide mechanism of the present invention.

Figure 4 is a plan view of the shifter arm constructed in accordance with the present invention.

With reference to the above drawing, the controlling mechanism of the present invention is shown as provided with shifter forks 10 and 11 for effecting shifting operations into first and second and third and fourth speed connections, respectively. The shifter fork 10 for controlling the first and second speed change operations is mounted upon a shifter rod 12, while the fork 11 is mounted upon shifter rod 13. In the interest of simplicity the details of the mechanism transmission are not shown herein but the transmission housing is indicated as being broken away at 14. The cover 15 of the transmission housing is adapted to carry the control mechanism, and shifter shafts 12 and 13, as well as a reverse shifter shaft 16 are slidably mounted within the cover 15 as shown in Figure 2. The shafts may be notched as at 17 and spring-pressed detents 18 may be provided to position the shafts properly in desired positions corresponding to the several speed change positions required.

Secured within the housing 14 is a guide rod 19 upon which reverse shifter fork 20 is adapted to slide. A spring-pressed ball 21, carried within the hub of the fork 20, engages notches 22 in the rod 19 in order that the shifter fork 20 may be properly positioned. The hub of the shifter fork 20 is also formed with a slot 23 within which a pin 24 is adapted to engage, the pin 24 being mounted upon one end of an arm 25 which is pivoted at 26 in the cover 15. The other end of arm 25 is formed with a pin 27 which is adapted to engage a slot 28 formed in a flange 29 upon a reverse shifter sleeve 30. The sleeve 30 is slidable upon the reverse rod 16 and is formed with a boss 31 having a horizontal guide plate 32. The boss 31 is also formed with a well 33 within which a plunger or stop 34 is slidably received, a spring 35 serving to urge the plunger 34 upwardly. The boss 31 is also provided with a horizontal well 36 within which a ball 37 is received, a spring 38 normally urging the ball 37 against the plunger or stop 34. A peripheral groove 39 is formed in the plunger and the ball 37 is adapted to be received within this groove, thus maintaining the plunger normally in a desired position. The plunger is so formed that the top surface 40 thereof lies flush with the horizontal guide plate 32, the purpose of which will appear hereinafter.

Each of the rods 12 and 13 are provided with fingers 42 and 43, respectively, the ends of the fingers being provided with laterally extending portions 44. Recesses or notches 45 and 46 are formed in the ends of the respective fingers 42 and 43, these notches receiving the adjacent end of a shifter arm 47. In neutral position, the recesses 45 and 46 are in vertical alignment with the plunger 34 and movement of the arm 47 in a vertical plane causes the end thereof to engage either of the notches 45 or 46. In this connection, the guide plate 32 is formed with a notch 48 within which the upper portion of the plunger or stop 34 lies. When the arm 47 is moved downwardly and the plunger 34 depressed thereby the end of the arm engages the notch 48 and enables the reverse shifter sleeve 30 to be moved axially to effect reverse shifting operations.

The shifter arm 47 is journaled upon a guide rod 49 and is provided with an arm 50, the end of which is formed with a spherical or ball surface 51. This spherical end of arm 50 is received within a socket 52 which is formed within an axially slidable and rotatable shaft 53. Rotation of the shaft 53 about its axis thus effects the selecting operation to position the end of the arm 47 in the proper notches 45, 46, and 48, while axial motion of the shaft 53 causes a corresponding motion of the arm 47 upon the guide shaft 49 to effect the shifting of the selected shifter fork. It will thus be seen that the selecting and shifting operations of a standard transmission may be effected from the side of the mechanism rather than by means of a lever mounted directly above the mechanism. Moreover, by providing the reverse shifter in the mechanism above described, the accidental shifting into the reverse position is prevented by the plunger 34. The initial resistance of ball 37 to motion of the plunger is greater than the resistance offered toward the end of the reverse selecting motion. In this fashion, the shifting of the mechanism into the reverse position can only be accomplished by a positive manual operation. After the plunger 34 has been fully depressed, the only force exerted thereon is that of the light return spring 35.

While the invention has been described with specific reference to the accompanying drawing, it is not to be limited, save as defined in the appended claim.

I claim as my invention:

A transmission mechanism having a plurality of shifter rods lying in a horizontal plane, shifter fingers on the shifter rods, the ends of the fingers having angular portions terminating in a vertical plane, a transmission operating mechanism, a lever to actuate the fingers by the mechanism, a guide rod parallel to the shifter rods and upon which the lever is slidably journaled intermediate its ends, and a ball and socket joint between the mechanism and the adjacent end of the lever.

KEITH R. MANVILLE.